Nov. 29, 1932.  A. L. ADATTE  1,889,306
LIGHT CONTROL FOR PHOTOGRAPHIC PRINTING MACHINES
Filed March 21, 1928  4 Sheets-Sheet 1
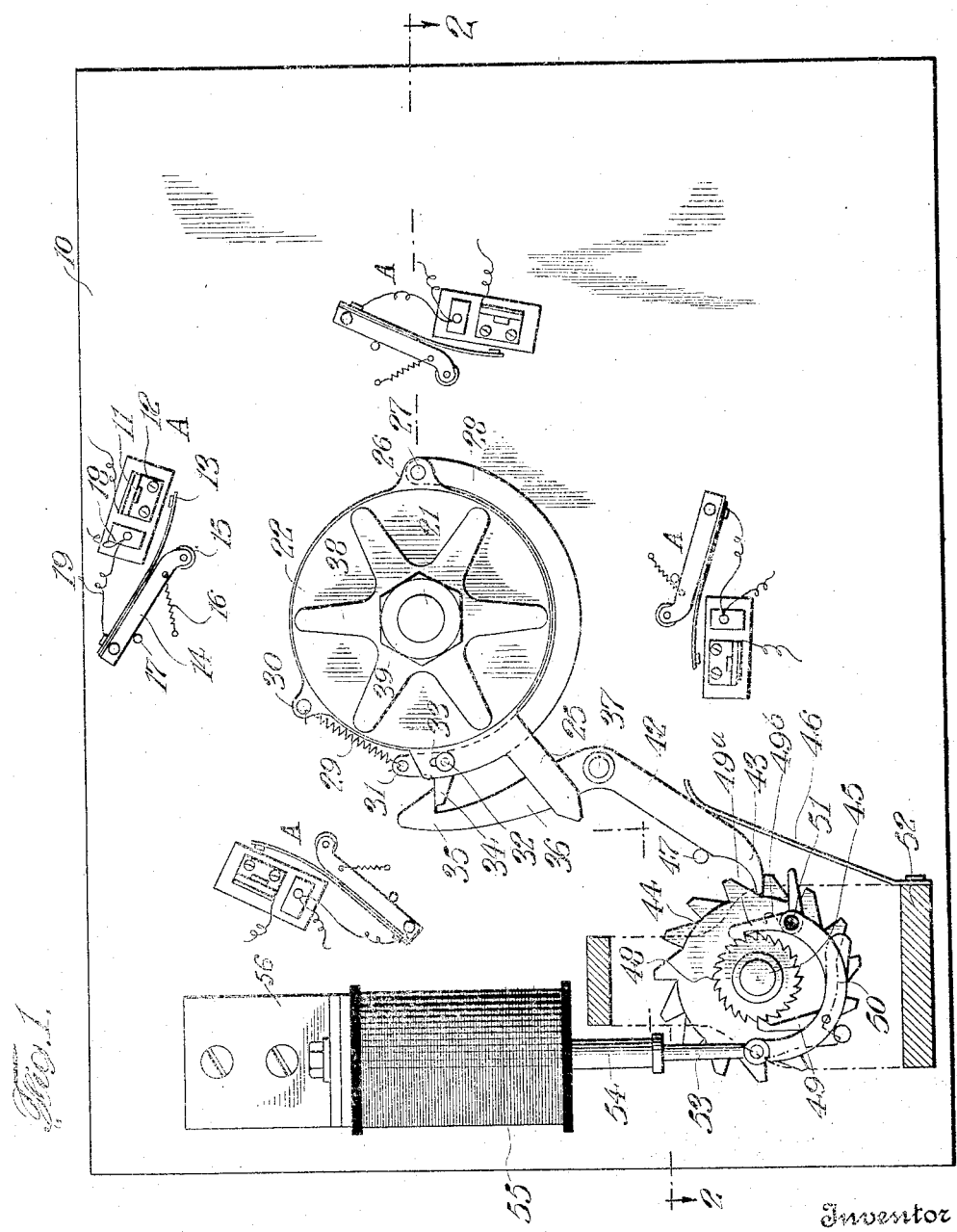
Inventor
Albert L. Adatte
By his Attorneys
Hoguet and Neary

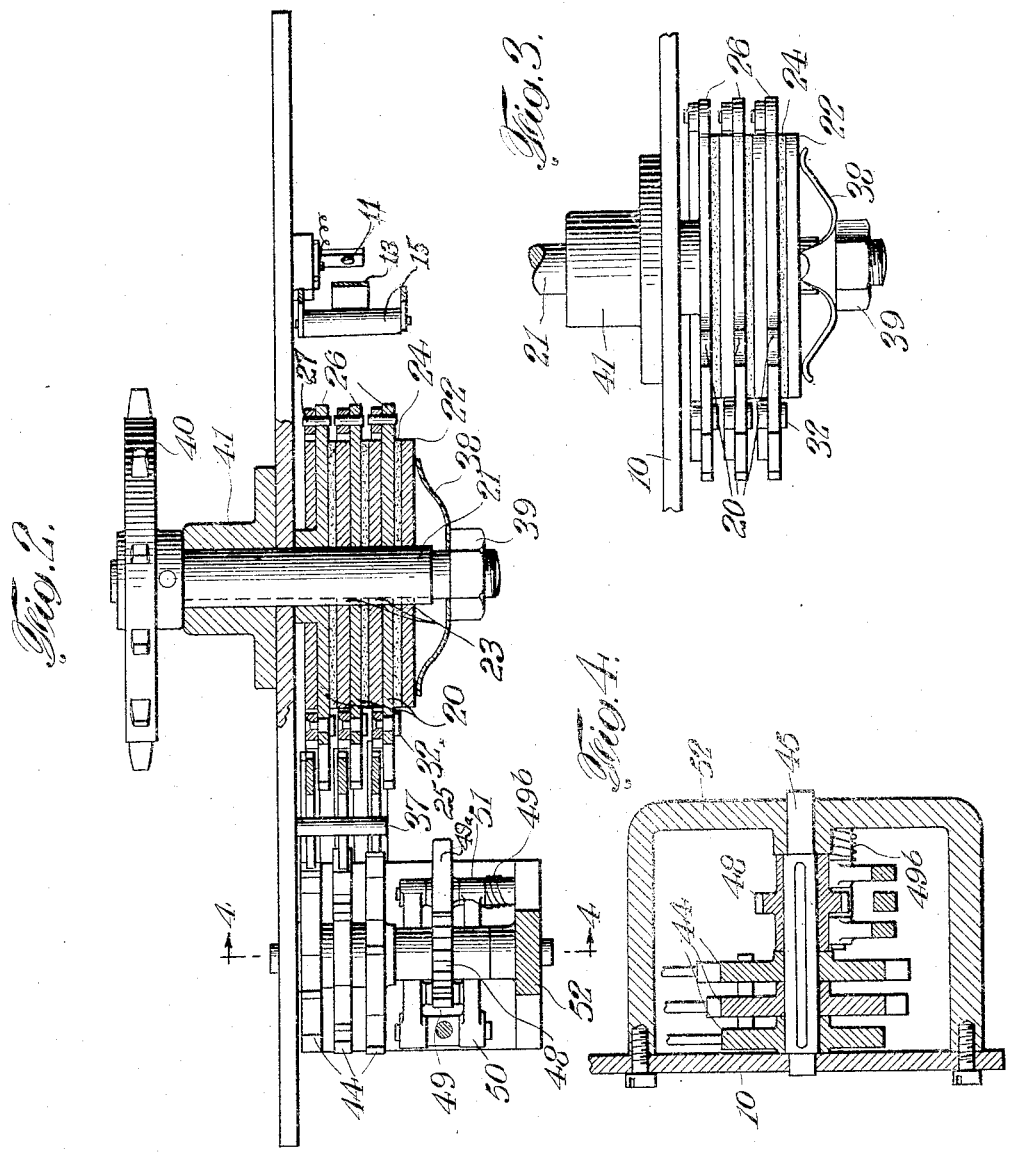

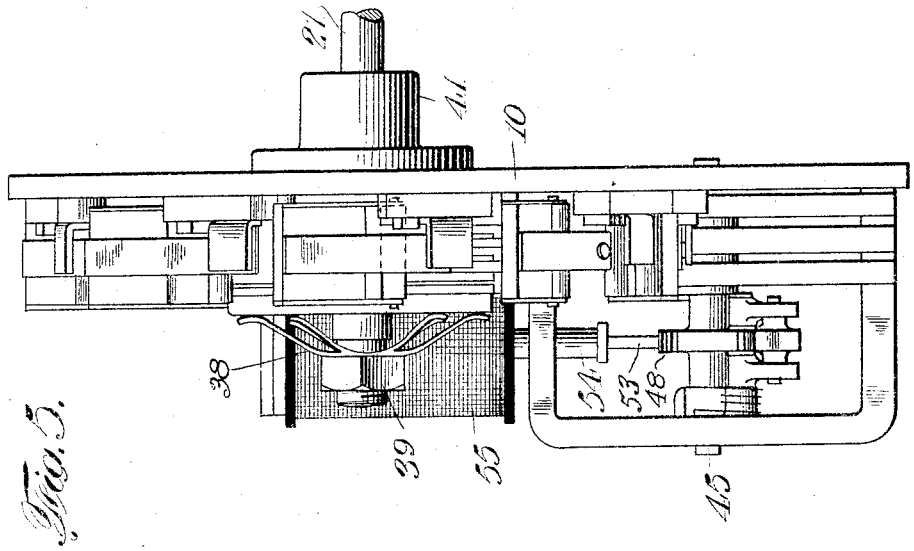
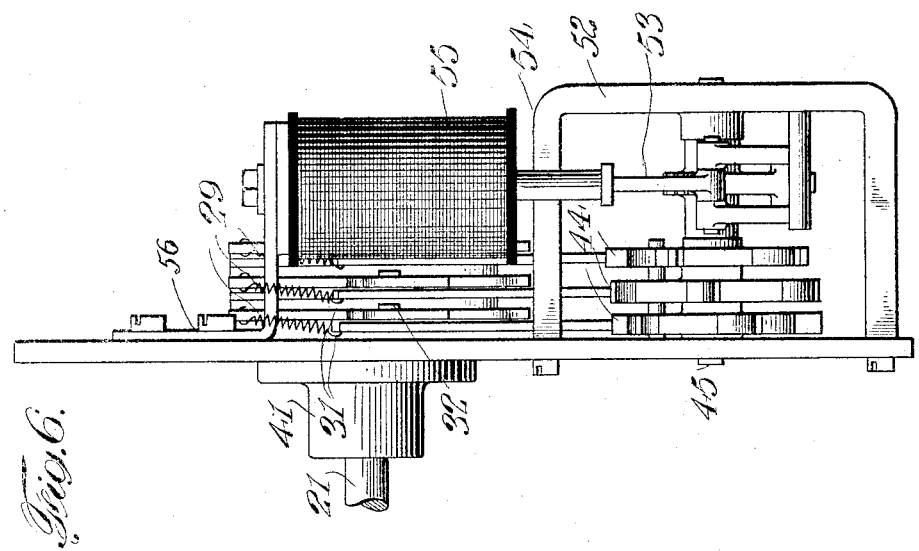

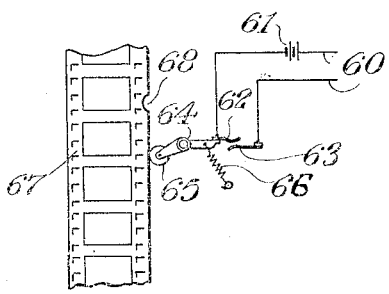

Patented Nov. 29, 1932

1,889,306

UNITED STATES PATENT OFFICE

ALBERT L. ADATTE, OF NORTH PLAINFIELD, NEW JERSEY, ASSIGNOR TO PATHE EXCHANGE, INC., OF BOUNDBROOK, NEW JERSEY, A CORPORATION OF NEW YORK

LIGHT CONTROL FOR PHOTOGRAPHIC PRINTING MACHINES

Application filed March 21, 1928. Serial No. 263,393.

The present invention relates to improvements in means for controlling the lights in photographic printing machines for motion pictures.

It is the usual practice to print a positive motion picture film from a negative film by running the two films together in juxtaposition one against the other thru a printing machine past a light aperture in the machine so that light emitted thru the aperture from a suitable light source, such as an electric bulb, passes simultaneously thru the negative and positive films and the negative pictures are printed as positives upon the positive film. In order to compensate for the variable densities of the films as well as to provide for different brilliancies of the pictures or scenes, the intensity of the light emitted thru the aperture and films must be varied from time to time during the passage of the negative film with the positive film thru the machine and past the light aperture. This has been achieved by a variable resistance in the light circuit. The present practice is to vary the resistance automatically as predetermined places in the negative film come opposite the light aperture. The variation in resistance is usually obtained by the provision of notches on the side of the negative film at the predetermined places of control. These notches function to control an electric circuit and the energization of the circuit actuates a device which in turn changes the resistance in the light circuit. Various types of resistances may be used and inasmuch as such resistances are well known it is not intended in this specification to specify any particular type. It is to be noted also that means other than notches on the side of the film may be employed for automatic control purposes. For example, perforations in the film such as shown in my patent application, Serial No. 146,622, filed November 6, 1926, may be used for purposes of control.

The foregoing general system of printing positive films from negative films has recently been improved by providing for the printing of a plurality of positive films from a single negative during a single passage of the negative thru the printing machine. Such an apparatus is disclosed in the joint application of Chanier and Adatte, Serial No. 253,705, filed February 11, 1928 which has matured into Patent Number 1,714,203, patented May 21, 1929. In such apparatus a plurality of light apertures are utilized and the negative film is passed before the light apertures and positive films are fed with the negative past respective apertures, there being a positive printed at each aperture. The light rays emitted thru the respective apertures penetrate the negative and the respective positives, and print the positive films from the negative film.

My present invention aims to provide a light control for varying the intensities of the lights used in a printing apparatus for printing a plurality of positive motion picture films from a single motion picture negative during the passage of the negative thru the machine, and in its broader aspects comprises means for varying the lights of the machine successively and in timed relation with the movement of the film so that the positive films obtained are uniform and similar in every respect and light changes occur with the same places on the negative opposite and in front of the lights. More specifically, my invention aims to provide an apparatus in which the intensities of the various lights are varied successively and in timed relation with the movement of the film by a single notch or other means of control upon the film. The invention also includes a novel mechanism for controlling a plurality of devices and electric circuits successively in timed relation and in combining this mechanism with the other elements of the apparatus, and arranging it in such a way that the operation and control of the circuits are synchronized with the passage of the films thru the machine.

Other objects, desirable features and advantages of the invention will become apparent as the description proceeds.

In the drawings:

Figure 1 is an elevational view partly in section and illustrating a form of the means for successively controlling a plurality of devices and circuits in timed relation.

Figure 2 is a transverse sectional view on the line 2—2 of Figure 1.

Figure 3 is an end elevational view of a portion of the apparatus.

Figure 4 is a cross-sectional view taken as on the line 4—4 of Figure 2.

Figure 5 is an end elevational view looking from the right of Figure 1.

Figure 6 is an end elevational view looking from the left of Figure 1.

Figure 7 is a diagrammatic schematic view showing an arrangement of circuits and elements in a printing machine according to the present invention.

Figure 8 is a fragmental view to illustrate more clearly the nature of a film control means that may be employed.

As shown in the drawings, the means for controlling a plurality of circuits successively in timed relation comprises a unit having a base 10 and a plurality of switches A, disposed on said base in a generally circular manner, the switches each comprising a stationary contact 11 associated with a binding post 12 for an electric conductor and a movable leaf spring contact 13 for cooperation with the contact 11, the leaf spring contact being carried on a pivoted arm 14. The arms 14 carry at their free ends rollers 15 and are normally biased to retracted position by springs 16 against stops 17 so that the circuits are normally opened between the stationary contacts 11 and the movable leaf spring contacts 13. The leaf springs are of conductive material and are connected to binding posts 18 by wires 19. Each switch is included in an electric circuit and each electric circuit functions to control the resistance of a light circuit. Although four switches are shown in the drawings, it will be understood that any desired number may be employed in the practice of the invention corresponding to the number of lights to be controlled.

Means are provided for momentarily closing the switches successively in timed relation by causing engagements between contacts 13 and 11 of the switches. This means may comprise preferably a plurality of disks 20 which are mounted on a shaft 21 located centrally with respect to the switches. The disks 20 are loosely mounted on the shaft 21 and are spaced on the shaft by disks 22 which are interlocked with the shaft as indicated at 23 so as to rotate continuously therewith. The rotary disks 22 act thru friction material 24 against the disks 20 which, as before pointed out, are loosely mounted on the shaft 21. The loose disks 20 have fingers 25 projecting radially from the periphery, and each disk also has a projection 26 carrying a pivot 27 for a curved arm 28 which, as best shown in Figure 1, may partially surround the periphery of a disk 22. The curved arms are biased inwardly against the peripheries of the disks as by means of springs 29. One end of each spring extends thru an eyelet 30 on the respective disk 20 and the other end extends thru an eyelet 31 on the free end of the respective curved arm 26 associated with the disk. Each curved arm also carries a pin 32 which extends thru a slot 33 in a part of the respective disk or its finger 25. Each arm 28 also has a peripherial tooth 34 which is normally engaged by the hooked end 35 of a lever 36 which is pivoted on a stationary pivot 37 carried on the base 10. As shown in the drawings there are three levers 36, one for each loosely mounted disk 20 and all the levers are preferably pivoted on the same pivot 37. As will appear more fully hereinafter, the number of levers, as well as the number of loose disks, is purely optional and may be varied as desired. The shaft 21 projects thru the series of disks and also thru the base 10 and one end carries a dished spring or other means 38 cooperating with the end of the series of disks and serving to resiliently urge them together. A nut 39 is attached to the end of the shaft and may be adjusted to vary the action of the spring 38. The other end of the shaft 21 extends thru the base 10 and carries a sprocket wheel 40 or other means by which rotation may be communicated to the shaft 21 and a collar 41 is preferably interposed between the sprocket and the base to improve the construction.

The shaft 21 is continuously rotated by virtue of the sprocket wheel 40 and the disks are continuously rotated with it. The disks 20, however, are normally maintained against rotation by the action of the hooked ends of the levers 36 on the teeth 34 associated with arms 28 of the disks 20. It will be seen, however, that when the levers are operated to disengage the disks and to move the hooked ends of the levers out of engagement with the teeth 34, the disks 20 are released and are frictionally rotated by the disks 22 acting thru the friction material 24.

The levers do not, however, act directly on the disks, 20, or the fingers 25 rigidly associated therewith, but act upon the teeth 34 of the arms, 28. The disks 20 are subject at all times to the friction of the rotating disks, and consequently the disks creep slightly forward under the action of the friction until resisted by the tension of springs 29 or limited by the pins 32 in the slots, 33. The result is to put the springs 29 under tension with the arms somewhat out from their normal positions. Upon release of the teeth 34 by the levers, the arms are pulled quickly in by the springs 29 so as to impart an initial impulse to the disks 20 in a manner to start them quickly in rotation. This arrangement eliminates any tendency of the disks 20 and fingers 25 to remain stationary even after release and compensates for any lag in the application of friction from the rotating disks 22 thru the friction material 24.

Means are provided for releasing the levers individually, and as will more fully hereinafter appear, this means is operated automatically by the negative film when the negative film reaches a predetermined position in its travel thru the printing machine. The levers 36 are provided with other arms 42 having tapered ends 43 which engage with ratchet wheels 44 mounted on a shaft 45 also carried by base 10 of the apparatus.

The levers are normally urged by springs 46 so that the tapered ends engage the peripheries of the ratchet wheels, a stop 47 being preferably provided for the backs of the levers. As best shown in Figure 1, the teeth of the ratchet wheels are spaced at considerable distances around the peripheries of the wheels and there is a ratchet wheel for each lever. Each ratchet wheel is preferably identical in character, but the teeth of adjacent wheels are staggered with respect to one another so that the levers are tripped alternately one after the other and not simultaneously. On the shaft 45 there is also positioned a ratchet wheel 48 of usual construction, the teeth of which are engaged by a pawl 49 associated with a curved link 50 pivoted on a shaft 51 carried on a portion of a yoke 52. Into this yoke the shaft 51 is journaled at one end, the other end of the shaft being journaled in the base 10. The shaft 51 is normally stationary. The ratchet wheels on shaft 45 are all keyed or otherwise permanently affixed to the shaft so that the shaft and ratchet wheels rotate as a unit. If desired, another pawl, 49a, may be positioned on shaft 51 and biased into engagement with the teeth of ratchet 48 as by a spring 49b to insure against reverse action of the ratchet.

The free end of the curved link 50 is connected or pivoted to the end of a rod 53 carried by the magnetic plunger or core 54 of a solenoid 55 which is also fastened or otherwise secured to the base 10 as by bracket 56.

When the circuit thru the solenoid 51 is completed and current traverses the windings of the solenoid, the magnetic core is pulled upward into the solenoid in a well-known manner, the curved link 50 is moved with it, and the pawl 49 associated with the curved link acts upon the teeth of the ratchet wheel 48 to cause one step in the rotation of shaft 45. The step rotation of the shaft causes the ratchet wheels 44 to be rotated with it and one of the levers 36 is tripped and a corresponding disk 20 set into rotation. The energization of the solenoid is only momentary, however, and the core or plunger of the solenoid falls back immediately into a position to be again moved upwardly upon energization of the solenoid and to again cause a step in the rotation of the ratchet wheels. The next step rotation of the ratchet wheels causes another of the levers to be tripped thereby releasing another disk 20.

The levers are successively tripped one after the other upon successive energizations of the solenoid, the result being achieved by the staggered nature of the teeth on the ratchet wheels 44 as above explained, and the successive actuations of the levers causes the disks 20 to be successively released and successively rotated under the frictional action of the rotary disks 22. Whenever a disk 20 is released and rotated, the finger 25 associated with it is also rotated and this finger as it rotates engages the rollers 15 moving the pivoted arms 14 to momentarily cause the switches to be closed thru contacts 11 and 13. The closing of the switches occur successively in timed relation. The time between the closing of each adjacent switch is measured by the time required by the finger 25 to rotate from the first switch to the second.

Referring to Figures 7 and 8 of the drawings, it will be noted that the solenoid is included in a circuit 60 containing a suitable source of current 61. This circuit is controlled by switch contacts 62 and 63, one of which, 62, is preferably carried on an arm of a pivoted lever 64 and is movable by said lever to engage or disengage the contact 63 to make or break the circuit 60. A roller 65 is carried on another arm of the lever and engages the side of the negative film 67. The roller is biased into engagement with the side of the film by spring 66 and the action of the film on the roller is normally such as to maintain the lever in a position with the switch contact 62 out of engagement with the contact 63 and the circuit 60 normally broken and the solenoid deenergized. The negative film is, however, provided with notches 68 at predetermined places thereon and whenever the roller 65 strikes one of these notches, it is urged by the spring 67 into the notch allowing the lever 64 to move on its pivot and the switch contact 62 to engage the contact 63 to cause a momentary completion of the circuit 60 and a momentary energization of the solenoid. Inasmuch as the negative film is traveling continuously thru the machine, the roller only seats in the notch for a very short time and as soon as it leaves the notch, the circuit thru contacts 62 and 63 is again broken by virtue of the movement of the contact 62 by the lever under the influence of the action of the film upon the roller 65.

The momentary energization of the solenoid is sufficient to cause movement of the core of the solenoid and release of one of the levers 36, allowing a disk 20 to rotate carrying a finger 25 with it, as explained above. This finger successively engages the switches arranged around the disks and closes successively the circuits thru said switches by causing contact between contacts 11 and 13. Each pair of contacts 11 and 13 controls a circuit 69 to a device 70, which when energized by the closing of the circuit 69 serves to vary the resistance to a light 71 which is supplied with energy and current from a constant source 72 in the light circuit 73. There is one light for each positive film 74 printed from the negative, and, as clearly shown in Figure 7, the lights are arranged in back of the negative in operative relation with its path and at spaced distance apart so that the same place on the negative passes successive lights at different times. In other words, the notch 68 after causing the functioning of the switch contacts 62 and 63 by being engaged by the roller 65 passes successively past the lights 71 and, of course, there is a certain time interval between the time required for the notch or other place in the film to pass from one light to the next light. In order that the apparatus successfully function and in order that all the positive films shall be uniform and similar in character, it is necessary for the changes in the lights 71 to occur when the same place or notch upon the negative comes opposite each light and the corresponding positive. Therefore, it is necessary for the devices 70 which control the variation in resistances in the light circuits to function at different periods and in timed relation with the movement of the film through the machine, the time between the functioning of successive resistances corresponding to the time it takes the predetermined place on the negative to pass from one light and positive to the next or successive light and positive. This time interval is provided by the apparatus of the present invention and corresponds to the time required for the finger 25 on the disk (which has been set in action by the energization of the solenoid) to pass from one of the switches, A, to the next. It will be seen in effect that the apparatus comprises a plurality of devices for controlling the lights which are operated successively in timed relation by switches in the electric circuits of said devices, the switches being operated successively in timed relation by a rotary contact passing from one switch to the next and operating said switches in timed relation with the movement of the negative film and by a single notch upon the film. The notch upon the film sets into action the rotary contact which successively actuates the plurality of switches in timed relation to cause the successive and timed actuation of the devices controlling the intensities of the lights.

To insure accurate synchronism between the rotary disks and the movement of the film the sprocket, 40, may preferably be driven in synchronism with the film feeding mechanism and may be geared with respect to the same.

As above explained, I preferably employ three disks 20 as well as three levers 36 for controlling these disks. As a matter of fact it may be necessary to only employ one disk. This will be true wherever the distances between successive notches or other predetermined places of control upon the negative film occur at sufficient distances apart to enable the disk to make a complete revolution before the negative has traveled thru the machine to a sufficient extent to bring the second notch into operative relation with the roller 45. It sometimes happens, however, that the intensities of the lights are to be controlled and varied at very short time intervals so that the distance between successive notches is not great enough to allow the complete rotation of a disk 20 and its finger 25, after actuation by one of the notches before the next notch reaches the roller 65. In such a case it will be seen that one of the disks may be still rotating at a time the next notch comes to the roller 65. With only a single disk used, the roller would in such case be operated upon without any action whatever occurring in the devices for controlling the intensities of the lights. Therefore, I prefer to employ a plurality of disks so that if one is rotating when a notch comes opposite the roller 65, another disk will be released to successively close the circuits. This is achieved by the provision of the ratchets 44 having their teeth spaced apart on their peripheries and the teeth of the ratchets staggered relative to one another so that on intermittent rotation of the shaft 45 under successive energizations of the solenoid the levers 36 are successively operated one after the other to successively release the disks 20 and enable them to make a revolution before being again stopped by the hooked ends 35 of the levers 36 engaging with the teeth 34.

The positive films 74 contact with the face of the negative as indicated in Figure 7. There is a positive corresponding to each light and each positive has sufficient contact with the negative to come within the influence of the respective light rays which pass thru negative and positive. The positives and negative are fed in unison and simultaneously. Means for achieving this result are disclosed in the Chanier and Adatte application, Serial No. 253,705, to which cross-reference has hitherto been made. Any means to this end may be employed in the practice of this invention.

Many variations and changes in the specific constructions and arrangements shown may be resorted to without departing from the invention. As already explained, the notch on the film is only one means of film control that may be used and any equivalent of such means may be utilized in carrying out the invention. Moreover, the specific construction of the rotary element for successively controlling the plurality of resistance regulating devices may be changed in practice and the constructions herein exemplified are to be considered merely as illustrative.

Having thus described the invention, what I claim and desire to secure by Letters Patent is:—

1. A photographic printing machine in which a negative motion picture film and positive motion picture films are fed in unison through the machine with the positives contacting with the negative at spaced intervals along the negative, comprising a plurality of lights arranged in back of the negative and positives and spaced with a light in back of each positive where it contacts with the negative, electric circuits for the lights, switches in the circuits, and means for operating the switches in timed relation to the travel of the film, said means comprising a movable element for successively operating the switches upon movement, means tending to produce movement of said element, means operating to normally hold said element against movement, and a single device for releasing the movable element, said releasing means being operated by a means of control at a predetermined place on the negative film.

2. A photographic printing machine in which a negative motion picture film and positive motion picture films are fed in unison through the machine with the positives contacting with the negative at spaced intervals along the negative, comprising a plurality of lights arranged in back of the negative and positives and spaced with a light in back of each positive where it contacts with the negative, electric circuits for the lights, switches in the circuits, said switches being arranged in a generally circular manner, a plurality of rotary elements for operating the switches successively, means tending to produce rotation of said elements, means operating to normally hold said elements against rotation, means for successively releasing the rotary elements, said releasing means being operated by a single device controlled by a predetermined place on the negative film.

3. The combination with a photographic printing machine adapted to print a plurality of positive films from a negative film and having a plurality of light sources at spaced intervals along the path of said positive and negative films, of means for successively varying the intensity of said light sources in timed relation with said negative film, said means comprising a single set of circumferentially spaced switches, each switch adapted to control the intensity of a light source, means for actuating said switches successively in timed relation with the passage of a certain point on said negative successively over said light sources, said last mentioned means controlled by a single means adapted to be controlled by a predetermined point on said negative film.

4. The combination with a photographic printing machine adapted to print a plurality of positive films from a negative film and having a plurality of light sources at spaced intervals along the path of said positive and negative films, of means for successively varying the intensity of said light sources in timed relation with said negative film, said means comprising a group of circumferentially spaced switches, each switch adapted to control the intensity of a light source, a plurality of means, each means adapted to operate said switches of said group successively in timed relation with the passage of a certain point on said negative successively over said light sources, and means adapted to successively operate said plurality of means, said means adapted to be controlled by successive predetermined points on said negative film.

5. The combination with a photographic printing machine adapted to print a plurality of positive films from a negative film and having a plurality of light sources at spaced intervals along the path of said positive and negative films, of means for successively varying the intensity of said light sources in timed relation with said negative film, said means comprising a plurality of spaced switches, each switch adapted to control the intensity of a light source, means for actuating said switches successively in timed relation with the passage of a certain point on said negative successively over said light sources, means on said last mentioned means to impart an initial impulse thereto, said switch actuating means controlled by a single means adapted to be controlled by a predetermined point on said negative film.

6. The combination with a photographic printing machine adapted to print a plurality of positive films from a negative film and having a plurality of light sources at spaced intervals along the path of said positive and negative films, of means for successively varying the intensity of said light sources in timed relationship with said negative film, said means comprising a plurality of circuits, each circuit adapted to control the intensity of a light source, a single rotary switch means adapted to close said circuits successively in timed relation with the passage of a certain point on said negative successively over said light sources, said rotary switch means controlled by a circuit having a switch adapted to be controlled by a predetermined point on said negative film.

7. The combination with a photographic printing machine adapted to print a plurality of positive films from a negative film and having a plurality of light sources at spaced intervals along the path of said positive and negative films, of means for successively varying the intensity of said light sources in timed relationship with said negative film, said means comprising a plurality of circuits, each circuit adapted to control the intensity of a light source, a single rotary switch means adapted to close said circuits successively in timed relation with the passage of a certain point on said negative successively over said light sources, said rotary switch means controlled by a circuit having a switch adapted to be controlled by a predetermined point on said negative film, and means on said rotary switch means to impart an initial impulse thereto.

In testimony whereof, I have signed my name to this specification this fourteenth day of March, 1928.

ALBERT L. ADATTE.